United States Patent [19]
Eskeli

[11] 3,986,361
[45] Oct. 19, 1976

[54] TURBINE WITH REGENERATION

[76] Inventor: Michael Eskeli, 7994-41 Locke Lee, Houston, Tex. 77042

[22] Filed: July 30, 1975

[21] Appl. No.: 600,312

[52] U.S. Cl. .................................. 60/650; 415/64; 415/178
[51] Int. Cl.² .......................................... F25B 3/00
[58] Field of Search .............. 62/86, 401, 402, 499; 415/178, 64; 60/650, 682, 721

[56] References Cited
UNITED STATES PATENTS
3,834,179  9/1974  Eskeli .................................. 62/401

*Primary Examiner*—Allen M. Ostrager

[57] ABSTRACT

A method and apparatus for the generation of power in a turbine, wherein a gaseous working fluid is passed within a rotor to compress the working fluid and then the fluid is accelerated and then decelerated to generate said power. Heat is added to the working fluid usually before said deceleration, and heat is usually removed from the working fluid after said deceleration. The turbine also is provided with regeneration means where heat is exchanged between streams of the working fluid within the rotor. The working fluid may be sealed within the rotor or be supplied from external sources. The turbine can also be used for heat transfer work with the reversal of rotation, if desired.

5 Claims, 3 Drawing Figures

TURBINE WITH REGENERATION

CROSS REFERENCES TO RELATED APPLICATIONS

This application is a continuation-in-part application of "Turbine with Regeneration", filed Dec. 30, 1974, Ser. No. 537,067.

BACKGROUND OF THE INVENTION

This invention relates generally to devices for generating power, wherein a working fluid is circulated within a rotor to generate the power.

In my earlier U.S. Pat. Nos. 3,874,190, "Sealed Single Rotor Turbine," 3,834,179, "Turbine with Heating and Cooling", and 3,895,491, "Turbine with Dual Rotors," I had described turbines of the centrifuge type, where a working fluid is circulated and first compressed, and then expanded, with generation of power.

SUMMARY OF THE INVENTION

It is an object of this invention to improve the efficiency of the previously patented turbines, by providing a regenerative section for the working fluid, thus increasing the working fluid temperature before heat addition, and thus reducing the needed amount of heat to be added, and also reducing the needed rotor speeds. Further, the heat transfer between streams of the working fluid is done while one stream is being accelerated and other stream is decelerated, thus improving further the thermal efficiency of the turbine. Further, the apparatus described herein can be also used as a high efficiency heat pump or heat transfer device, by simply reversing the rotation as is noted hereinafter.

DESCRIPTION OF PREFERRED EMBODIMENTS

Figure 1:
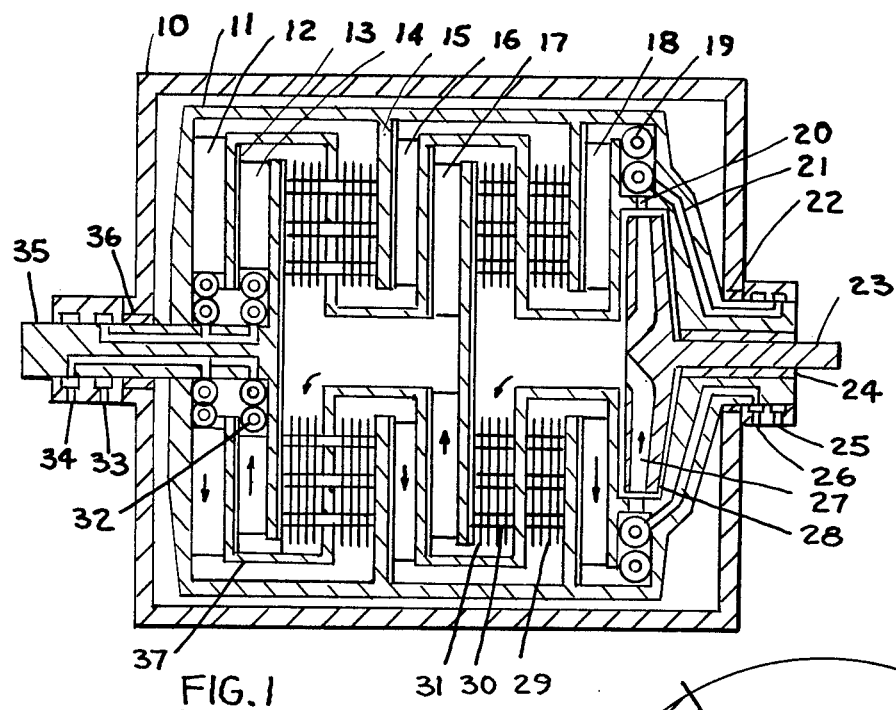
FIG. 1 is an axial cross section of the device.

Referring to FIG. 1, therein is shown a cross section of the device. 10 is casing supporting bearings 36 and 22, and shafts 23 and 35 are supported by said bearings. First rotor 11 is supported by shaft 35 and by bearings 24. 12, 16, 17 and 18 are first rotor vanes within working fluid passages, 13 is thermal insulation, 15 is divider wall, 19 is heat addition heat exchanger, 20 are working fluid nozzles for passing working fluid into second rotor 28, 21 is heating fluid conduit, 25 and 26 are heating fluid inlet and outlet, 27 are vanes within second rotor working fluid passages, 29, 30 and 31 form a heat exchanger for exchanging heat between two streams of the working fluid and comprise of circular fins 29 and 31 supporting heat pipes 30 filled with a suitable heat transfer fluid, 37 is divider, 32 is cooling heat exchanger, 33 and 34 are cooling fluid entry and exit.

Figure 2:
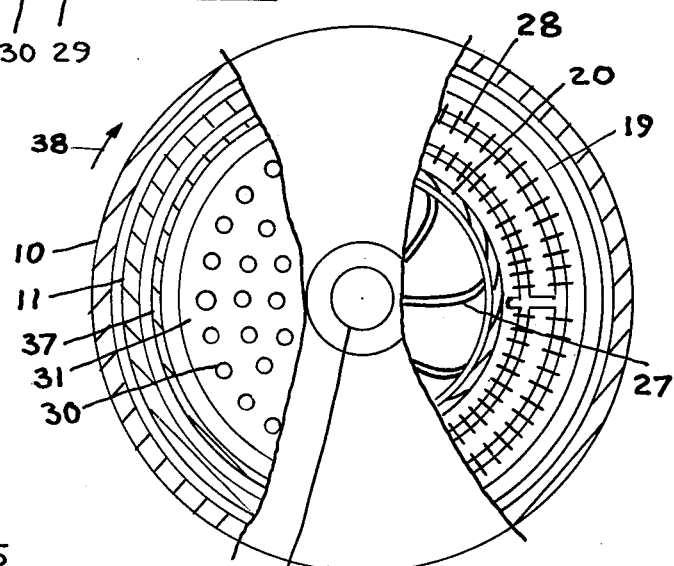
FIG. 2 is an end view of the unit of FIG. 1.

In FIG. 2, an end view of the unit shown in FIG. 1 is illustrated. 28 is second rotor, 20 are nozzles, 19 is heat addition heat exchanger, 27 is second rotor vane, 35 is first rotor shaft, 30 and 31 are heat exchanger components, 37 is divider, 11 is first rotor and 10 is casing, and 38 indicates direction of rotation for both rotors when used as a turbine; this direction is reversed when the unit is used as a heat pump.

Figure 3:
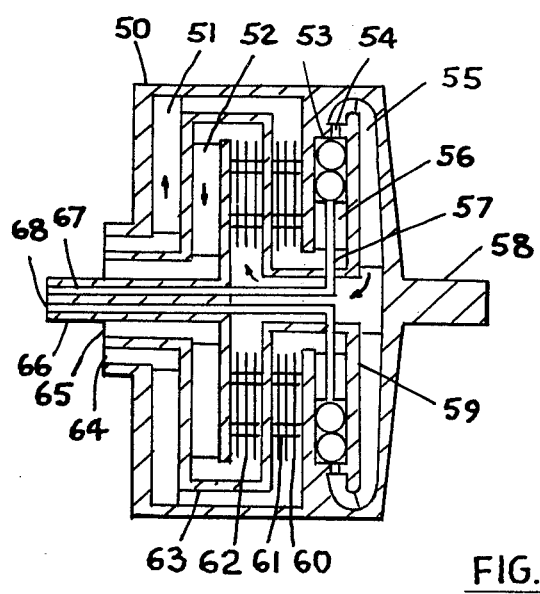
FIG. 3 is a cross section of another form of the device rotor.

In FIG. 3, another form of the unit is shown, in a rotor cross section. In this unit, a single rotor is used, and the working fluid is supplied from external sources. 50 is rotor, supported by shafts 58 and 66, 51, 52, 55 and 56 are vanes within rotor working fluid passages, 53 is heat addition heat exchanger, 54 are working fluid nozzles, 59 is divider, 60, 61 and 62 form a working fluid heat exchanger comprising of circular fins supporting heat pipes 61, 63 is divider, 64 and 65 are working fluid entry and exit and 67 and 68 are heating fluid entry and exit. The turbine portion of this rotor is similar to that shown in my previous U.S. Pat. No.3,874,179, for example.

The operation of this device is as implied hereinbefore. Referring to the unit of FIG. 1, the working fluid is compressed first adiabatically in passages defined by vanes 12, and then expanded with heat addition, with the heat addition heat coming from a return stream of same working fluid being compressed in the adjacent passage with heat removal, and thus heat is transferred from one stream of working fluid to another stream of working fluid. The working fluid is again compressed in another step and then expanded with heat addition in passages defined by vanes 16 and fins 31, and then again compressed essentially adiabatically in passages defined by vanes 18, after which the working fluid receives heat in heat exchanger 19, and is passed through nozzles 20 into second rotor 28 passages defined by vanes 27, and from there back into first rotor where the working fluid undergoes alternate compression with heat removal and expansion with adiabatic conditions, until it reaches passages defined by vanes 14, and after expansion in these passages, the working fluid passes through heat exchanger 32 to adjust the working fluid temperature to a predetermined value, after which the working fluid passes to passages 12 thus completing its cycle.

Work is required by the first rotor for its rotation, and work is produced by the second rotor. The difference in these work quantities is the net work output of the turbine. Usually, the two rotors are connected by a power transmission device, such as a gearbox, so that a part of the work put out by the second rotor is passed into the first rotor, with the remainder being available to drive an external load.

The rotor rotational speeds are usually greater for the second rotor than for the first rotor.

The operation of the unit shown in FIG. 3, is similar to that described hereinbefore for the unit of FIG. 1. The working fluid enters from outside and is compressed first with adiabatic conditions and then expanded with heat addition, after which the working fluid is compressed again adiabatically, and then heat is added, and then discharged from nozzles 54 usually forwardly thus increasing the tangential velocity of the working fluid. After such discharge, the working fluid enters passages defined by vanes 55 producing work during its deceleration, and then the working fluid is compressed with heat removal and expanded adiabatically and then discharged.

In the unit of FIG. 1, there are two compression-expansion steps, and in the unit of FIG. 3, there is one compression-expansion step. The number of steps used may vary as desired; generally, when more steps are used, it will result in a reduced needed rotational speed for the rotors, and also, with additional steps, the thermal efficiency is generally improved for the turbine. It should be also noted, that an external working fluid source can be used with the unit of FIG. 1, and similarly, the unit of FIG. 3 can be closed, with the addition of a cooling heat exchanger. Thus, the various parts shown in the FIG. 1 and FIG. 3 are interchangeable as desired.

The nozzles 20 may be oriented to discharge forward if desired, or alternately, the second rotor vanes may be curved, or the fins of heat exchanger 19 be slanted away from the radial. For best efficiency, the working fluid should enter the second rotor at the tip velocity of the second rotor, but this is not mandatory. Usually, the nozzles 54 should be oriented to discharge the working fluid forwardly for best efficiency, but here also, the vanes may be curved instead, or heat exchanger fins slanted away from the radial.

The units shown in the drawings and described herein can be also used for heat pumping service, by simply reversing the rotational direction. For the unit of FIG. 1, the two rotors are usually connected via a gearbox, and their speed ratio is fixed, although the ratio could be also variable. Thus, if power is applied at the gearbox shaft, the rotors will rotate at a fixed speed ratio and if the direction of rotation is opposite to that shown in FIG. 2, the working fluid also will circulate opposite to the directions indicated in FIG. 1, and the unit will function as a heat pump. Heat is removed from the working fluid at heat exchanger 19, and heat is added in heat exchanger 32. The unit of FIG. 3 will also function as a heat pump with reversal of direction of rotation from the direction used when the unit is used as a turbine.

It should be noted that minor improvements in performance as a heat pump can be obtained if the heat exchanger 32 is located entirely within passages defined by vanes 12; this may also be helpful when the unit is used as a turbine, with some fluids. Such variations in the heat exchanger location are within the scope of this invention. Similarly, the heat exchanger 19 may be extented or relocated in the passage defined by vanes 18.

As noted hereinbefore, the nozzles 20 and nozzles 54 may be deleted, if desired, and other means used to direct the working fluid flow. flow.

The casing 10 may be evacuated if desired to eliminate fluid friction on external surfaces of the rotor.

The heat exchangers for transferring heat between working fluid streams are shown to be made using circular disc fins and heat pipes. Other types heat exchangers may be used, such as vanes serving as heat exchanger fins, finned tubing filled with a circulating heat transfer fluid, and others. Similarly, other types of heat exchangers may beused for heat exchangers 19, 32 and 53, than the finned tubing shown in the figures.

In my previous application "Turbine with Regeneration", Ser. No. 537,067, I had described a turbine with a regenerator attached for transferring heat from one stream of working fluid into another stream, but this heat transfer occurred in a constant pressure, normally, or in a continuously variable pressure, if the heat exchanger was tapered. In the invention of this application, the heat transfer occurs while one fluid stream is being compressed and another working fuid stream is being expanded, in steps, with adiabatic processes as part of each step. This form of heat exchange results in an improvement in the thermal efficiency of the unit as compared to the previous application unit, and also good thermal efficiencies can be obtained even with low temperature heat sources, such as may be found in waste heat or in geothermal applications. Also, when this unit is used as a heat pump, high coefficient of performance can be obtained.

1. A thermodynamic machine comprising:
    a. a shaft journalled for rotation;
    b. a rotor mounted on said shaft to rotate therewith; said rotor comprising:
        i. a set of radially outwardly extending fluid passages, with a first and a second, a third and fourth, and fifth and sixth passages connected at their outward ends, and said second and third, fourth and fifth, and sixth and first passages connected at their inward ends to form a continuous fluid conduit to pass a working fluid alternately outwardly and inwardly within said rotor, with said working fluid filling said rotor passages;
        ii. a working fluid regenerative heat exchanger to exchange heat between working fluid streams flowing within said second and fifth passages, said working fluid heat exchanger exchanging heat with said working fluid simultaneously while said working fluid is being expanded in said second fluid passage, and is compressed within said fifth passage;
        iii. a first external heat heat exchanger carried by said rotor and in heat exchange relationship with said working fluid near the outward ends of said third and fourth outward extending fluid passages to exchange heat with a heat transfer medium supplied from sources external to said rotor.

2. The thermodynamic machine of claim 1 wherein said rotor is provided a second external heat heat exchanger to exchange heat with said working fluid near the inward ends of said sixth and first outward extending fluid passages.

3. The thermodynamic machine of claim 1, wherein said machine is provided a second rotor and said fourth outward extending fluid passages are at least in part within said second rotor.

4. In a method of regeneration within a rotor wherein a working fluid heat exchanger exchanges heat between two streams of a working fluid, the improvement comprising:
    a. a step type regenerative heat exchanger wherein heat is exchanged within a rotor between two streams of said working fluid while one stream of said working fluid is being compressed by centrifugal force, and the other stream of said working fluid is being expanded against centrifugal force.

5. The method of claim 4 wherein two or more steps of regeneration are provided in sequence to improve the overall thermodynamic efficiency of the regenerative process by alternately expanding and compressing said working fluid with a simultaneous heat exchange.

* * * * *